(12) United States Patent
Breau et al.

(10) Patent No.: US 8,180,825 B2
(45) Date of Patent: *May 15, 2012

(54) TRAFFIC DIFFERENTIATED NETWORK SERVICES

(75) Inventors: Jeremy Breau, Leawood, KS (US); Frederick C. Rogers, Olathe, KS (US); Lyle T. Bertz, Lee's Summit, MO (US); Arun Santharam, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/152,142

(22) Filed: Jun. 2, 2011

(65) Prior Publication Data

US 2011/0238727 A1 Sep. 29, 2011

Related U.S. Application Data

(63) Continuation of application No. 11/949,498, filed on Dec. 3, 2007, now Pat. No. 7,979,564.

(51) Int. Cl.
*G06F 15/16* (2006.01)

(52) U.S. Cl. ...... 709/202; 709/228; 370/331; 455/432.1

(58) Field of Classification Search .......... 709/200–203, 709/217–228; 370/331, 351, 395.3; 455/431.1, 455/433, 435.1, 432.1
See application file for complete search history.

(56) References Cited

U.S. PATENT DOCUMENTS

| | | | |
|---|---|---|---|
| 6,430,698 B1 * | 8/2002 | Khalil et al. | 714/4.1 |
| 6,771,623 B2 * | 8/2004 | Ton | 370/331 |
| 7,228,415 B2 * | 6/2007 | Eschbach et al. | 713/162 |
| 7,437,154 B2 * | 10/2008 | Hahn | 455/426.2 |
| 7,587,498 B2 * | 9/2009 | Leung et al. | 709/228 |
| 7,606,227 B2 * | 10/2009 | Fukushima et al. | 370/390 |
| 7,899,456 B2 * | 3/2011 | Jagana et al. | 455/435.1 |
| 7,904,089 B2 * | 3/2011 | Famolari | 455/442 |
| 7,908,475 B2 * | 3/2011 | Smith et al. | 713/162 |
| 7,916,692 B2 * | 3/2011 | Yoshida | 370/329 |
| 7,979,564 B2 * | 7/2011 | Breau et al. | 709/228 |

* cited by examiner

*Primary Examiner* — Moustafa M Meky

(57) ABSTRACT

Network services are provided to client devices based on the network traffic to be communicated between the device and the network. A number of home agents are configured to provide network services to mobile nodes. The system is configured in such a way that a mobile nodes may be served by more than one of the home agents. Thereby, for example, a certain mobile node may be provided one type of network traffic via one home agent and a different type of network traffic via another home agent.

11 Claims, 6 Drawing Sheets

TRAFFIC DIFFERENTIATED NETWORK SERVICES

CROSS-REFERENCE TO RELATED APPLICATIONS

This application is a continuation of U.S. application Ser. No. 11/949,498 filed Dec. 3, 2007, which is titled "TRAFFIC DIFFERENTIATED NETWORK SERVICES," the entire disclosure of which is hereby incorporated by reference.

STATEMENT REGARDING FEDERALLY SPONSORED RESEARCH OR DEVELOPMENT

Not applicable.

SUMMARY

Network services are provided to a client device based on the network traffic to be communicated between the device and the network. In one aspect, a system is provided that includes a first home agent that is optimized to handle a first class of network traffic and a second home agent that is optimized to handle a second class of network traffic. The first home agent accepts a registration request from a mobile device for a first network session that includes the first class of application layer traffic, and rejects the registration request when the first network session does not include the first class of application layer traffic.

The second home agent accepts a registration request from the mobile device for a second network session that includes the second class of application layer traffic, and rejects the registration request when the second network session does not include the first class of application layer traffic. The second home agent provides the second network session to the mobile device concurrently with the first home agent that is providing the first network session to the mobile device when the second registration request is accepted while the first network session is in progress. Classes of network traffic are distinguished by packet transmission characteristics of each class of network traffic.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter. The invention is defined by the claims below.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

Figure 1:
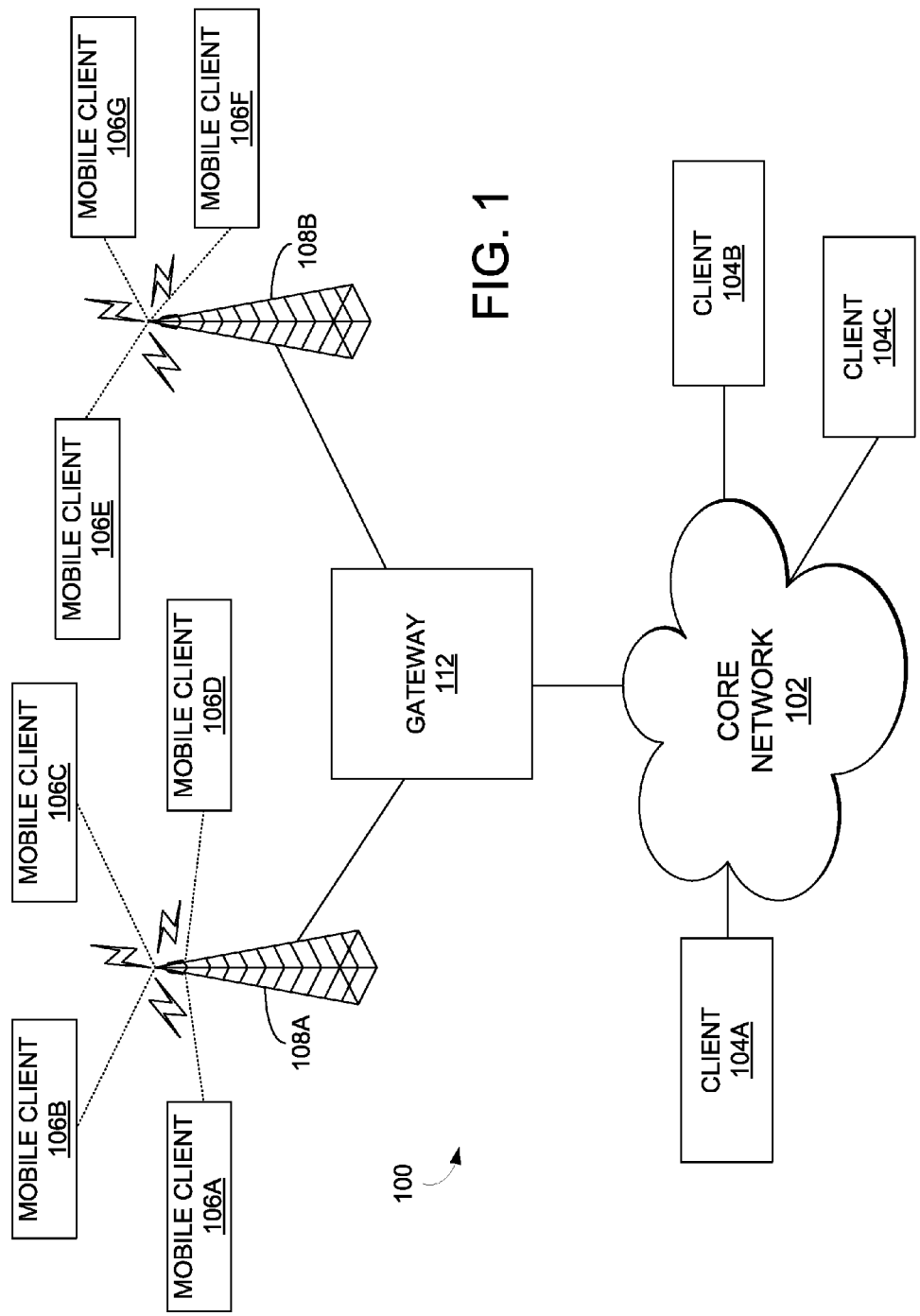
FIG. 1 is a block diagram of a network environment suitable for use implementing the present invention.

Embodiments of the present invention include improved systems and methods for providing network services to client devices based on the network traffic to be communicated between the device and the network. The invention may enable increased efficiency in handling network traffic through specialization of portions of the network.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| DVD | Digital Versatile Disc |
| PDA | Personal Digital Assistant |
| VOP | Voice Over Packet |
| GPS | Global Positioning System |
| IP | Internet Protocol |
| IPv4 | Internet Protocol Version 4 |
| MIME | Multipurpose Internet Mail Extension |
| MN | Mobile Node |
| HA | Home Agent |
| AG | Access Gateway |

Further, various technical terms are used throughout this description. An illustrative resource that fleshes out various aspects of these terms can be found in Newton's Telecom Dictionary by H. Newton, $22_{nd}$ Edition (2006).

The subject matter of the present invention is described with specificity to meet statutory requirements. But this description is not intended to limit the scope of this patent. Rather, the inventors have contemplated that the claimed subject matter might also be embodied in other ways, to include different steps or combinations of steps similar to those described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable consumer electronics, minicomputers, mainframe computers, and the like. Any number of computer-systems and computer networks are acceptable for use with the present invention.

Specific hardware devices, program languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer useable instructions form an interface to allow a computer to react according to a source of input. The instructions cooperate with other code segments to initiate a variety of tasks in response to data received in conjunction with the source of the received data.

The present invention may be practiced in any network environment such as a communications network. Such networks are widely used to connect various types of network elements, such as routers, servers, gateways, network telephones, and so forth. Further, the invention may be practiced in a multi-network environment having various, connected public and/or private networks. The networks may be wireless or wireline (wired). As will be appreciated by those skilled in the art, communication networks may take several different forms and may use several different communication protocols. And the present invention is not limited by the forms and communication protocols described herein.

"Client devices" are network elements that support user access to networks and/or run client applications. These devices may take any of a variety of forms. By way of example, a client device may be a computer, a personal digital assistant (PDA), a home appliance such as a security system, television, or coffee maker, a communication device such as a telephone, pager, email reader, or text messaging device, or any combination of these or other devices. These devices may connect to networks using various access technologies, both wireless and wireline, to obtain network services and/or communicate information in support of client applications. The present invention is not limited by the access technologies described herein. A client device may be configured to receive and/or convey information such as voice and data (e.g., fax, e-mail and other text messages) and/or other media (e.g., audio, video and graphics). Further, the client device may include input and output facilities such as a touch-pad, a keyboard, a camera, a display, a microphone and/or a speaker.

Client devices may support a variety of applications. By way of example, they may support voice communications such as local and long distance telephone, push to talk, or voice over packet (VOP), written forms of communication such as fax, text messaging, email, or pager, conferencing and collaboration tools, GPS (Global Positioning System) service, or the sending, receiving, or displaying of various media such as text, application data files (e.g., spreadsheets, word processing documents, and other data), audio, images, or video, or any combination of these or other applications. Some client devices are equipped with web browsing software to allow subscribers to communicate with web servers over an Internet Protocol (IP) network (i.e., the Internet).

Information communicated between network elements is commonly referred to as network traffic. Network traffic has numerous characteristics such as synchronicity, fragmentation (i.e., whether the communication is split up into packets or not), packet size, packet frequency, tolerance to latency or jitter, security or authentication requirements, among other characteristics. Thus, network traffic may be distinguished and classified in various ways. And different subsets or classifications of network traffic may overlap. For example, application layer traffic may be classified by the type, or types, of applications using the traffic (e.g., email, pager, text messaging, voice, peer-to-peer, GPS, file transfer, web browsing, image, video, audio, streaming audio, and streaming video). Application layer traffic may also be classified by the type, or types, of media used by the application. Multipurpose Internet Mail Extension (MIME) Types, are an example of a system for classifying types of media in such a manner, although other implementations are possible. For further information on MIME Types see RFC 2046, incorporated herein by reference.

Communications between a client device and a network may be organized into network sessions. These sessions generally have a beginning (session initiation) and an end (session termination). During a network session, certain session information is maintained to support communication between the client device and the network. This session information may include network addresses, connections, streams, or any combination of these or other constructs.

"Mobile" client devices may change location and attach to different networks or different parts of the same network. Mobile nodes are an example of mobile client devices, although other implementations are possible. Home agents direct communications between mobile nodes and networks. These communications may be organized into network sessions as discussed above. Mobile IP sessions are an example of such organization, in which a Mobile IP address for a mobile node is maintained throughout the session, even when the mobile node changes locations and network attachment points. For further information regarding an embodiment of Mobile IP sessions see RFC 3344, incorporated herein by reference.

According to an embodiment of the present invention, home agents are selected to serve a mobile client device based on the class of network traffic to be communicated between the device and the network. This differentiation allows different home agents to be optimized for handling the profile of a particular class of network traffic. For example, home agents may be optimized to handle particular packet size, packet frequency, latency, jitter, security and authentication issues, among other possible optimizations.

In another embodiment of the present invention, a client device is configured to establish different network sessions to service different types of client applications. Thus, in a possible embodiment, separate network sessions are established to handle, for example, VOP traffic and video traffic. In a further embodiment, the separate network sessions are serviced by different home agents. In such a system, not all home agents must be connected to all network support infrastructures. For example, a home agent that is specialized to handle only video traffic would not have to be attached to the network's infrastructure for supporting VOP services. This differentiation allows for specialization of different parts of the network.

FIG. 1 illustrates a network environment 100 that represents an exemplary environment in which the present invention may be practiced. It is important to note that network environments in which the present invention may operate may be arranged in a variety of configurations, and the network environment 100 of FIG. 1 provides only an exemplary network environment.

The network environment 100 includes a core network 102. The network 102 may be any network or combination of networks configured to provide communications between network elements. The network 102 provides communication services for clients 104A-104C. The clients 104A-104C may be any computing devices connected to the network 102, and each of the clients 104A-104C may have an address, such as an IP address, for uniquely identifying that client. The clients 104A-104C may interact with the network 102 to receive a variety of content such as voice, data, or video.

The network environment 100 may also include a wireless communication system configured to provide communication services to mobile clients 106A-106G. In an exemplary wireless communication system, each mobile client 106A-106G may communicate via an air interface with a base transceiver station 108A or a base transceiver station 108B. The base transceiver stations 108A and 108B may be coupled to any number of different devices that enable connectivity with the network 102, the public Internet and/or a private intranet (e.g., a wireless carrier's core network). The base transceiver stations 108A and 108B may utilize any number of wireless access technologies or standards known in the art to communicate with the mobile clients 106A-106G.

In order to facilitate network sessions originating from the mobile clients 106A-106G, the network environment 100 includes a gateway 112. As known to those skilled in the art, the gateway 112 may provide a variety of functions allowing clients to communicate with the core network 102. Such functions may vary based on the type of access technology being utilized by an originating client device. The gateway 112 may receive communication requests from the mobile clients 106A-106G, authenticate the clients, and assign network addresses.

Figure 2:
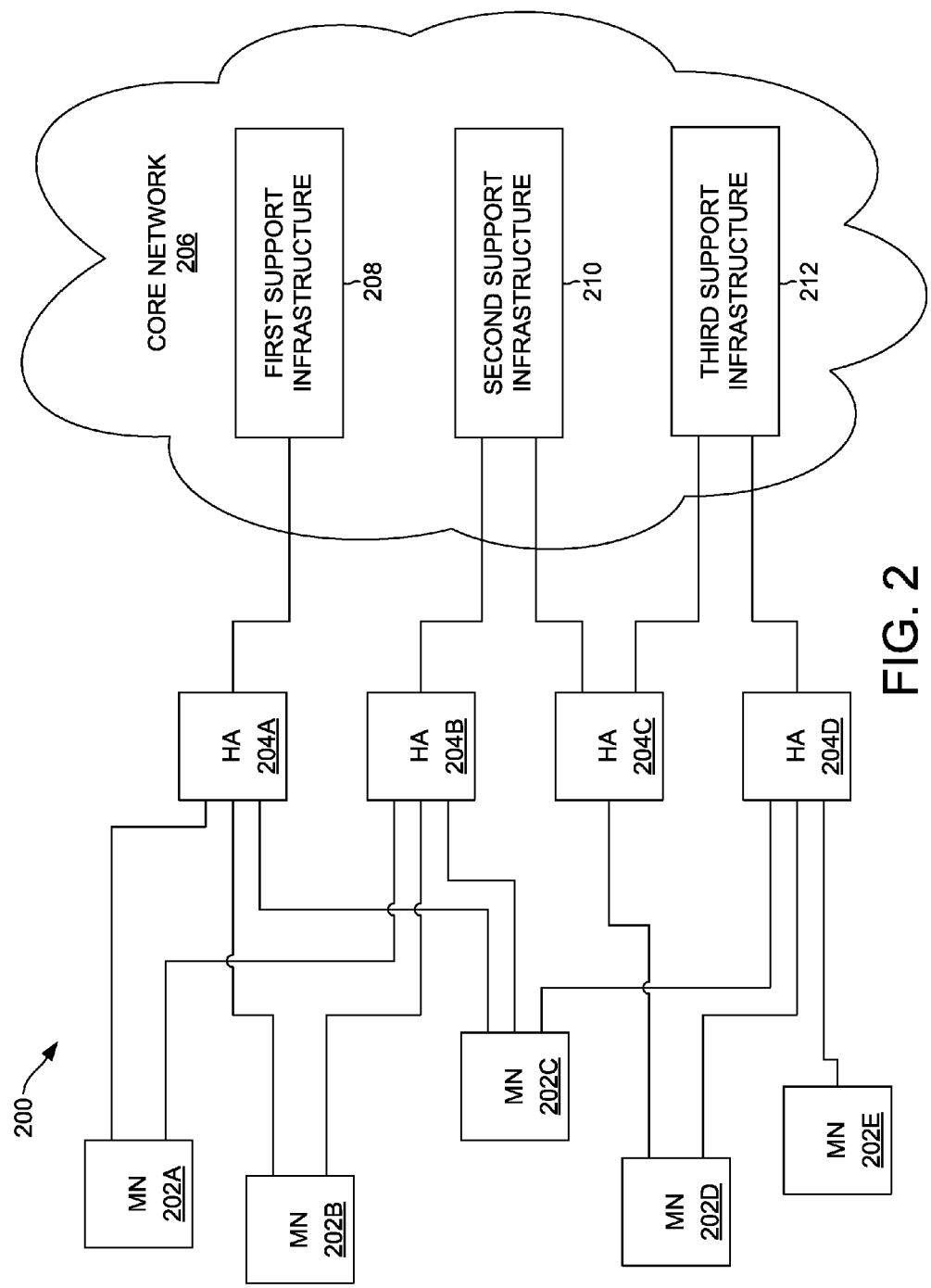
FIG. 2 is a block diagram of a system for providing network services to mobile nodes in accordance with an embodiment of the present invention.

FIG. 2 represents an exemplary network 200 which illustrates a system for providing network services to client devices in accordance with an embodiment of the present invention. Networks in which the present invention may operate may be arranged in a variety of configurations and may contain additional components. FIG. 2 merely provides a simplified representation of such networks in order to illustrate an embodiment of a system in accordance with the present invention.

The network 200 includes mobile nodes (MNs) 202A-202E. These MNs 202A-202E may be any number of client devices as discussed above. The MNs 202A-202E are attached to the network 200 and are provided network services via one of more of home agents (HAs) 204A-204D. The HAs 204A-204D are in turn attached to one or more support infrastructures 208, 210, and 212, within a core network 206.

Each support infrastructure 208, 210, 212 may provide network support for a different network service. For example, the first support infrastructure 208 may support push to talk communication, while the second support infrastructure 210 may support web browsing service, and the third support infrastructure 212 may support instant messaging service. The number of infrastructures and the examples given here are merely illustrative. Each support infrastructure may support any number of different network services and support infrastructures may overlap to provide a network service in conjunction with each other or redundant support for different network services. For example, email and web browsing require similar resources and could be supported by the same support infrastructure.

In this system, mobile nodes obtain access to different network support infrastructures, and thereby different network services, via different home agents. For example, as shown, the MN 202A is served by the HA 204A which provides access to the first support infrastructure 208. The MN 202A is also served by the HA 204B which provides access to the second support infrastructure 210. The MN 202C is served by three home agents, the HA 204A, the HA 204B, and the HA 204C, which provide access to the first support infrastructure 208, the second support infrastructure 210, and the third support infrastructure 212, respectively. The MN 202D is served by the HA 204C, which is attached to both the second support infrastructure 210 and the third support infrastructure 212, and the HA 204D, which is also attached to the third support infrastructure 212. Thus, the MN 202D may access network services provided by the third support infrastructure 212 via either the HA 204C or the HA 204D. This example illustrates one possibility for redundant access to network services under this system.

Further, because not all home agents must be attached to all support infrastructures in this network, this system allows for the specialization of different parts of the network. For example, the first support infrastructure 208 may provide services which require user authentication and security from outside access, while the third support infrastructure 212 may provide services that are open to anyone. Thus, within this system, the HA 204D, which is only attached to the third support infrastructure 212, would not necessarily have to support the authentication and security required by the first support infrastructure 208.

Figure 3:
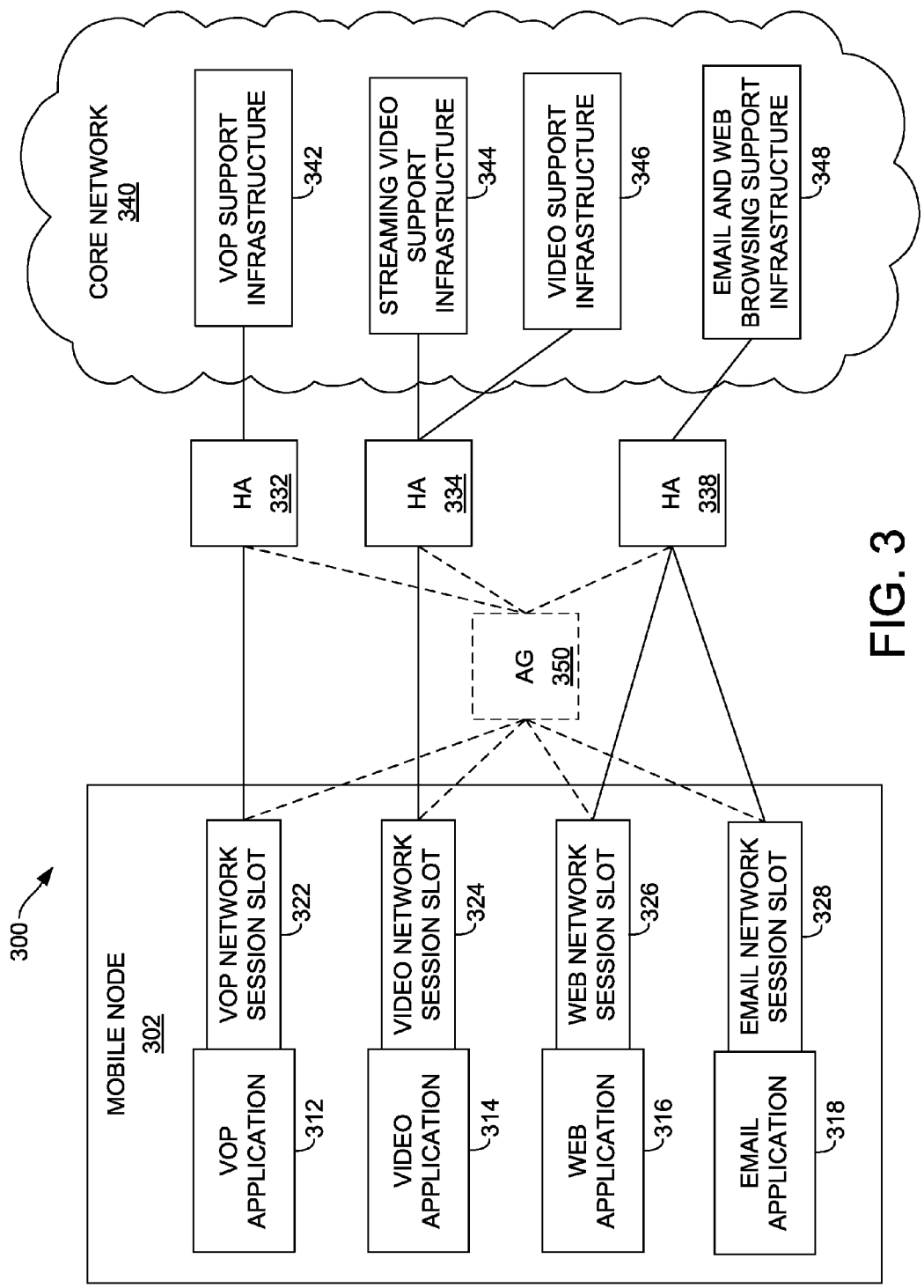
FIG. 3 is a schematic diagram illustrating the provision of network services to a single mobile node in accordance with an embodiment of the present invention.

FIG. 3 represents a portion of a network 300 which illustrates a system for providing network services to a client device in accordance with an embodiment of the present invention. Networks in which the present invention may operate may be arranged in a variety of configurations and may contain additional components. FIG. 3 merely provides a simplified representation of a portion of such a network in order to illustrate an embodiment of a system in accordance with the present invention. In FIG. 3, dashed lines represent network session setup signaling and solid lines represent network communications after system setup. Network communications after setup will be described first.

The network 300 includes a mobile node 302, which may be any number of client devices as discussed above. The mobile node 302 contains a VOP application 312, a video application 314, a web application 316, and an email application 318. These are client applications which run on the mobile node 302. Each of these applications communicates with the network 300 via at least one dedicated network session slot. Here: the VOP Application 312 communicates via a VOP network session slot 322; the video application 314 communicates via a video network session slot 324; the web application 316 communicates via a web network session slot 326; and the email application 318 communicates via a email network session slot 328.

Each network session slot communicates through at least one home agent (HA) 332, 334, or 338, to at least one support infrastructure 342, 344, 346, or 348 within a core network 340. Here, the VOP network session slot 322 communicates through the HA 332 to the VOP support infrastructure 342. The video network session slot 324 communicates through the HA 334 to the streaming video support infrastructure 344 and the video support infrastructure 346. The web network session slot 326 communicates through the HA 338 to the email and web browsing support infrastructure 348. Likewise, the email network session slot 328 communicates through the HA 338 to the email and web browsing support infrastructure 348. This communication may be two-way. Thus, each dedicated network session slot is provided access to network support infrastructure with facilities to support the corresponding application traffic communicated to and/or from the mobile node 302 to the core network 340.

The number and identity of the applications, network session slots, home agents, and support infrastructures presented here are merely illustrative. Many more types of applications run on client devices and could be supported by dedicated network session slots. Further, network session slots could provide service to multiple client applications. For example, the video network session slot 324 may support more than one video application configured to run on the mobile node 302. Also, network session slots may support different types of applications with similar network requirements. For example, the web application 316 and the email application 318 may be served by a single network session slot that would take the place of both the web network session slot 326 and the email network session slot 328. Conversely, some client applications could be served by multiple dedicated network session slots. The VOP application 312, for instance, could have separate network session slots for signaling and content which communicate with different portions of the core network 340.

As discussed above in reference to FIG. 2, support infrastructures may overlap and provide support for multiple types of client applications. For example, as shown here, the email and web browsing support infrastructure 348 provides network services for both the web browsing application 316 and the email application 318. Finally, home agents in such a system could be attached to more than one support infrastructure or serve more than one dedicated network session slot. Here, for example, the HA 334 provides access to both the streaming video support infrastructure 344 and the video support infrastructure 346. Also, the HA 338 serves both the web network session slot 326 and the email network session slot 328. Again, these examples are merely illustrative and many other configurations are possible.

Systems and processes for enabling network sessions may vary different embodiments of the present invention. In the embodiment depicted here, the access gateway (AG) 350 performs a home agent assignment function for the network 300. According to this process, the network session slots 322, 324, 326, and 328 each initiate network sessions by sending a registration request message to the AG 350. The AG 350 then determines which of the home agents 332, 334, or 338 to assign to support the particular network session. The AG 350 selects an appropriate home agent based on the network traffic to be communicated between the mobile node 302 and the core network 340 during the network session. The AG 350 then transmits the registration request to the selected home agent. For example, the VOP network session slot 322 sends a registration request message to the AG 350 to initiate a network session for the VOP application 312. The AG 350 selects the HA 332 to support this network session because the HA 332 is attached to the VOP support infrastructure 342 and can therefore provide access to the appropriate network facilities.

In some embodiments of the present invention, the network session slot may transmit an indication of application layer traffic to the AG 350 along with the registration request message. The AG 350 may then use this indication to select an appropriate home agent. Further detail regarding use of an indication of application layer traffic is provided below. The home agent assignment function described above could reside in any number of network devices. For example, the function could also be distributed among the home agents, 332, 334, and 338. In an embodiment, an appropriate home agent is selected by trial and error.

In this embodiment, a home agent may reject a registration request if it is not an appropriate home agent to support the requested network session. The network session slot may keep sending registration requests until one is accepted.

Figure 4:
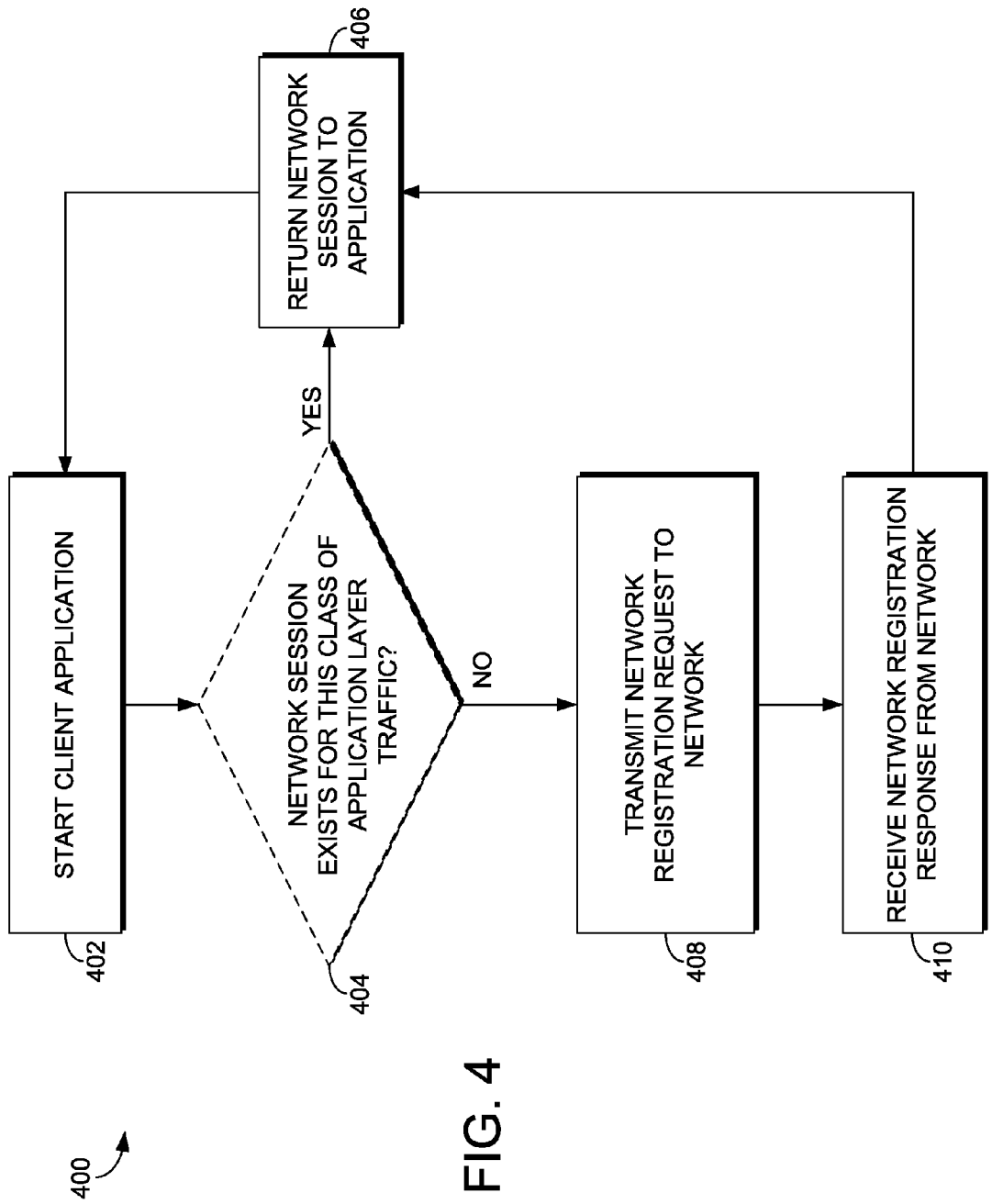
FIG. 4 illustrates a method for enabling network sessions between a client device and a network in accordance with an embodiment of the present invention.
Figure 5:
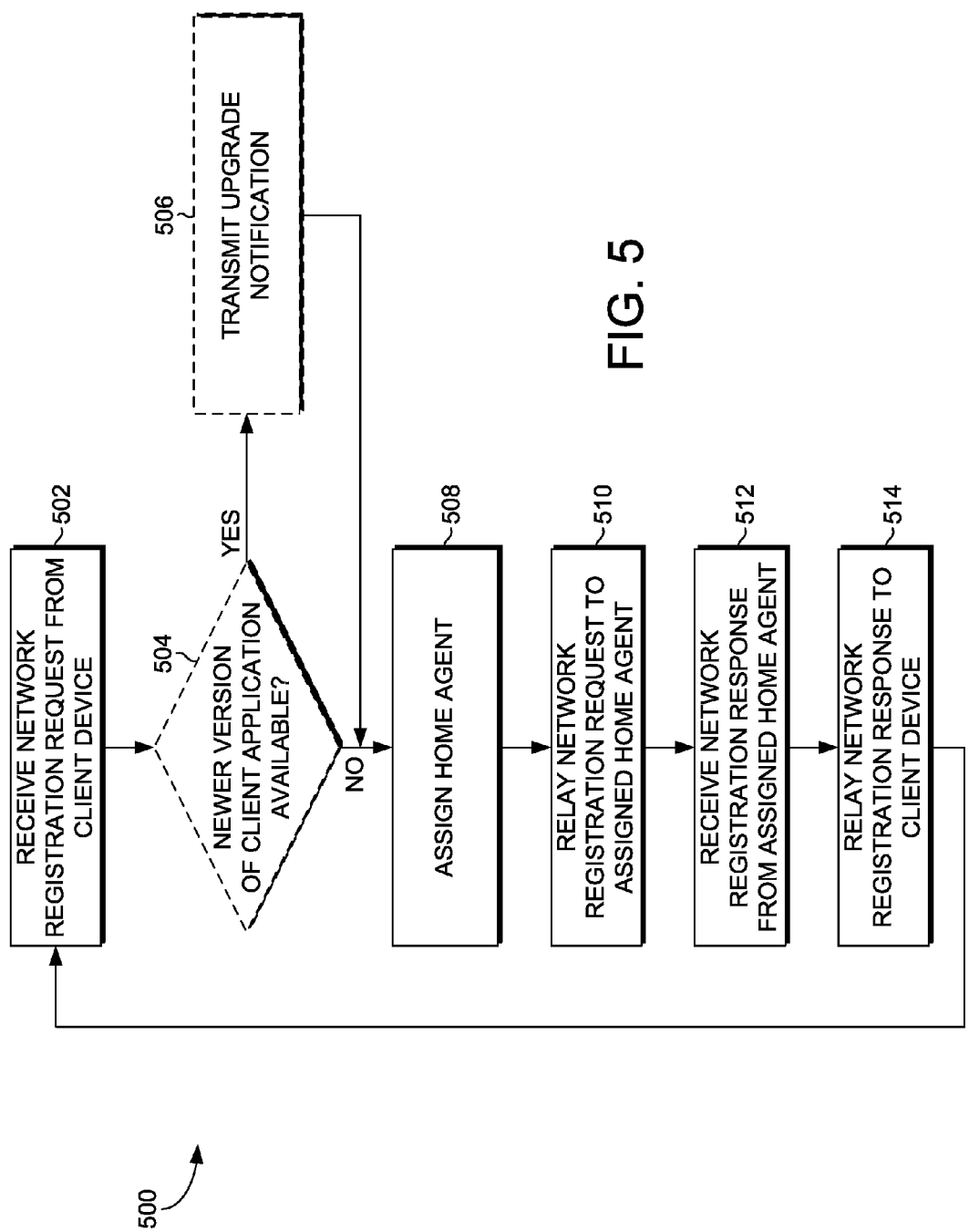
FIG. 5 illustrates another method for enabling network sessions between a client device and a network in accordance with an embodiment of the present invention.
Figure 6:
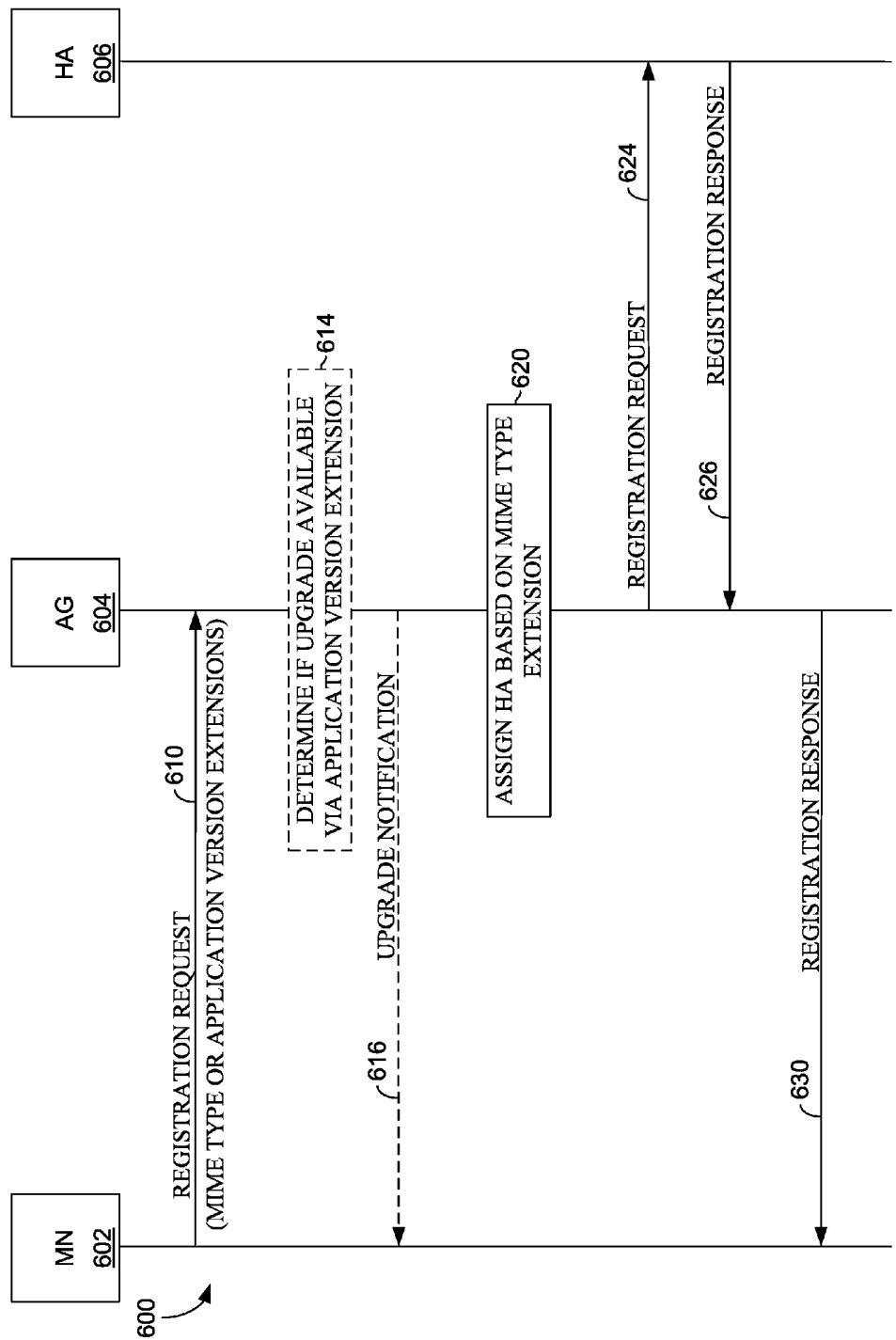
FIG. 6 illustrates a message flow diagram showing an example of network session setup signaling in accordance with an embodiment of the present invention.

FIGS. 4 and 5 illustrate methods which may facilitate enablement of network sessions and home agent assignment in embodiments of the present invention. FIG. 6 illustrates message flows in accordance with embodiments of the invention.

FIG. 4 illustrates a method 400 for enabling network sessions between a client device and a network in accordance with an embodiment of the present invention. The client device may be one of any number of different client devices equipped to communicate with the network, such as the mobile node 302 of FIG. 3. At a step 402, a client application which requires network services is started. At an optional step 404, the method 400 determines whether a network session already exists for supporting the application traffic generated by the client application. In embodiments employing dedicated network session slots, as discussed above in reference to FIG. 3, this step may be accomplished by checking the appropriate dedicated slot for network session information. If an appropriate network session exists, the method 400 proceeds to a step 406 and the network session information is returned to the client application. The method 400 may then repeat with the start of another client application at the step 402.

If an appropriate network session has not been established, or if the optional step 404 is not preformed, the method 400 proceeds to a step 408. At this step, the method 400 transmits a network registration request message to the network. An indication of the application layer traffic to be generated by the client application may be included with this request. As discussed below in reference to FIG. 5, this indication may take various forms. Once sent, the request message may be communicated amongst various elements of the network. For example, the message may be received by an access gateway such as the AG 350 of FIG. 3. The access gateway may then relay the registration request message to a selected home agent such as any of HAs 332, 334, or 338 of FIG. 3.

At a step 410, the network responds with a network registration response message. This response may be communicated amongst various elements of the network before being received by the method 400. For example, the response may be received from a home agent such as any of the HAs 332, 334, or 338 of FIG. 3. The response may also be relayed through a foreign agent as described in RFC 3344. The response may indicate whether or not the registration request of the step 408 was accepted. Network session information may be included with the response. At the step 406, the network session information is returned to the client application, and the network session is established. The method 400 may then repeat to establish another network session between the client device and the network with the start of another client application at the step 402.

FIG. 5 illustrates another method 500 for enabling network sessions between a client device and a network in accordance with an embodiment of the present invention. The client device may be one of any number of different client devices equipped to communicate with the network, such as the mobile node 302 of FIG. 3. At a step 502, the method 500 receives a network registration request message from the client device. Once sent from the client device, the request may be communicated amongst various elements of the network before reaching an element configured to perform the method 500.

An indication of the application layer traffic to be communicated over the network session may be included with the request. As discussed above, network traffic may be distinguished and classified in various ways and therefore, this indication may take various forms. Where the network session is associated with a particular client application or type of application, the application layer traffic may be indicated by the type of application using the traffic (e.g., email, pager, text messaging, voice, peer-to-peer, GPS, file transfer, web browsing, image, video, audio, streaming audio, and streaming video). Application layer traffic may also be indicated by the type of media used by the client application. In an embodiment of the present invention, MIME Types are used to indicate the application layer traffic to be communicated over the network session. For further information on MIME Types see RFC 2046.

Where the format of the network registration request message is extensible, the indication of application layer traffic may be added directly to the message format as an extension. For example, under the IP Mobility Support protocol for IP version 4 (Mobile IPv4), one of various protocols that may be used to implement the present invention, the format for registration request messages may be extended. See RFC 3344 at pp. 12-16. The following table illustrates an extended message format for registration requests iii accordance with an embodiment of the invention utilizing the Mobile IPv4 protocol:

| | | |
|---|---|---|
| Message Type = 0x01 | Flags = 0x02 | Lifetime = 0x0000 |
| Home Address = 0x00000000 | | |
| Home Agent Address = 0x00000000 | | |
| Care of Address = 0x00000000 | | |
| Identification 0x00000000 | | |
| Identification 0x00000000 | | |
| Identification 0x00000000 | | |
| Extension Type = 0x83 | Length = 0x00 | ASCII Encoded NAI . . . |
| Extension Type = 0x20 | Length = 0x00 | SPI |
| MN-HA Authentication Extension | | |

-continued

| | | |
|---|---|---|
| Extension Type = 0x84 | Length = 0x00 | MN-FA Challenge Extension |
| Extension Type = 0x24 | Sub-Type = 01 | SPI |
| MN-AAA Authentication Extension | | |
| Extension Type = 0xnew | Length = 0x(variable) | MIME Type, e.g. (video/avi) |
| MIME Type, e.g. (video/avi) | | |

The last extension adds a MIME Type to the message format, which may be used to indicate application layer traffic as discussed above.

An indication of a version of the associated client application may also be included with the network registration request. Where the format of the request message is extensible, the indication of the version of the associated client application may also be added directly to the message format as discussed above. Where this indication is present, the method 500 may proceed to an optional step 504. At this step, the method 500 checks to see if a newer version of the client application is available.

If a newer version is available, the method 500 may proceed to an optional step 506. At the step 506, the method 500 transmits an upgrade notification message, indicating that the client device may upgrade the client application. This upgrade notification message may be communicated amongst various elements of the network. For example, the message may be communicated to the client device itself. The client device may then contact the network to obtain the newer version of the client application. The message may also be communicated to an upgrade manager on the network. This network element could then contact the client device to deliver the newer version of the client application.

Regardless of the outcome of the optional step 504, the method 500 proceeds to a step 508. At the step 508, the method 500 assigns a home agent to support the network session, such as any of the HAs 332, 334, or 338 of FIG. 3. In some embodiments of the present invention, this assignment may be based on the application layer traffic to be communicated over the network session. For example, as depicted in FIG. 3, different portions of a core network may provide network infrastructure to support different client applications. Thus, the method 500 may assign a home agent attached to an appropriate support infrastructure for handling the application layer traffic to be communicated over the network session. Where an indication of application layer traffic is included with the network registration request message, as discussed above, the method 500 may utilize this indication in assigning a home agent.

At a step 510, the method 500 then relays the registration request to the assigned home agent for further action. The method 500 may generate a new request message, modify the request message received, or merely forward the request message unchanged to the assigned home agent. Once sent, the request may be communicated amongst various elements of the network before reaching the assigned home agent. At step 512, a network registration response message is received from the home agent. The response may be communicated amongst various elements of the network before being received by the method 500. In some embodiments, if the response indicates a rejection by the assigned home agent, the method 500 may return to step 508 and assign a different home agent until a response indicating acceptance is received.

Regardless, the method 500 proceeds to a stop 514, in which the response is relayed to the client device. The method 500 may generate a new response message, modify the response message received, or merely forward the response message unchanged to the client device. Once sent, the response may be communicated amongst various elements of the network before reaching the client device and thereby establishing the network session. If another network registration request message is later received from the client device, the method 500 may then repeat from the step 502 to establish another network session between the client device and the network.

FIG. 6 illustrates a message flow diagram 600 showing an example of network session setup signaling in accordance with an embodiment of the present invention. The messages depicted in this diagram may be communicated amongst other network elements in addition to those depicted in the diagram 600. The diagram 600 merely provides a simplified representation of setup signaling in accordance with an embodiment of the present invention. Other message and network elements may be added and other configurations are possible.

At a step 610, a mobile node (MN) 602 sends a registration request message to an access gateway (AG) 604. This registration request message may contain a MIME Type and/or application version extension, as discussed above in reference to FIG. 5. At an optional step 614, the AG 604 may determine that a newer version of a client application is available using the application version extension and, at a step 616, send an upgrade notification message to the MN 602. Related embodiments are discussed in reference to the steps 504 and 506 of FIG. 5.

Next, at a step 620, the AG 604 assigns the home agent (HA) 606 to serve the network session. In this embodiment of the present invention, the selection of the HA 606 is based on the MIME Type extension received with the registration request message of the step 610. Possible implementations of this selection process are further discussed in reference to the step 508 of FIG. 5.

Next, at a step 624, the AG 604 sends the registration request message on to the HA 606. The HA 606 responds, at a step 626, by sending a registration response message back to the AG 604. Finally, at a step 630, the AG 604 relays the registration response message to the MN 603. This completes the setup of the network session between the MN 603 and the network. As discussed above in reference to FIGS. 4 and 5, according to embodiments of the present invention, the process illustrated in the diagram 600 may be repeated to establish additional network sessions between the MN 602 and the network.

Many different arrangements of the various components depicted, as well as components not shown, are possible without departing from the spirit and scope of the present invention. Embodiments of the present invention have been described with the intent to be illustrative rather than restrictive. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need be carried out in the specific order described.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. A system for providing network services to a mobile device configured to communicate over a network, the system comprising:
a first home agent that is optimized to handle a first class of network traffic, wherein the first home agent accepts a first registration request from the mobile device for a first network session that includes the first class of application layer traffic, and wherein the first home agent rejects the first registration request when the first session does not include the first class of application layer traffic;
a second home agent that is optimized to handle a second class of network traffic, wherein the second home agent accepts a second registration request from the mobile device for a second network session that includes the second class of application layer traffic, and wherein the second home agent rejects the second registration request when the second session does not include the second class of application layer traffic;
wherein the second home agent provides the second network session to the mobile device concurrently with the first home agent that is providing the first network session to the mobile device when the second registration request is accepted while the first network session is in progress; and
wherein classes of network traffic are distinguished by packet transmission characteristics of each class of network traffic.

2. The system of claim 1, wherein the first registration request includes an indication of a class of application layer traffic to be transmitted over the first network session.

3. The system of claim 2, wherein the second registration request includes an indication of a class of application layer traffic to be transmitted over the second network session.

4. The system of claim 3, wherein the second home agent determines whether the second session includes the second class of application layer traffic based on the indication of the class of application layer traffic included in the second registration request.

5. The system of claim 2, wherein the first home agent determines whether the first session includes the first class of application layer traffic based on the indication of the class of application layer traffic included in the first registration request.

6. The system of claim 1, wherein the network comprises an IP network.

7. The system of claim 1, wherein at least one of the first network session and the second network session comprises a Mobile IP session.

8. The system of claim 1, wherein at least one of the first registration request and the second registration request further includes an indication of a version of a client application intending to communicate with the network; and
wherein the method further comprises
(1) determining that a newer version of the client application is available, and
(2) transmitting an upgrade notification message, indicating that the newer version of the client application is available.

9. The system of claim 1, wherein the first home agent provides the first network session to the mobile device via a first network session slot at the mobile device.

10. The system of claim 9, wherein the second home agent provides the second network session to the mobile device via a second network session slot at the mobile device.

11. The system of claim 1, further comprising the mobile device.

* * * * *